July 17, 1962  W. A. DOUGLAS ET AL  3,044,711
FLUID FLOW MODULATOR
Filed July 22, 1957  2 Sheets-Sheet 1

WILLIAM A. DOUGLAS
PAUL P. DATNER

*INVENTORS*

BY D. Gordon Angus
*ATTORNEY*

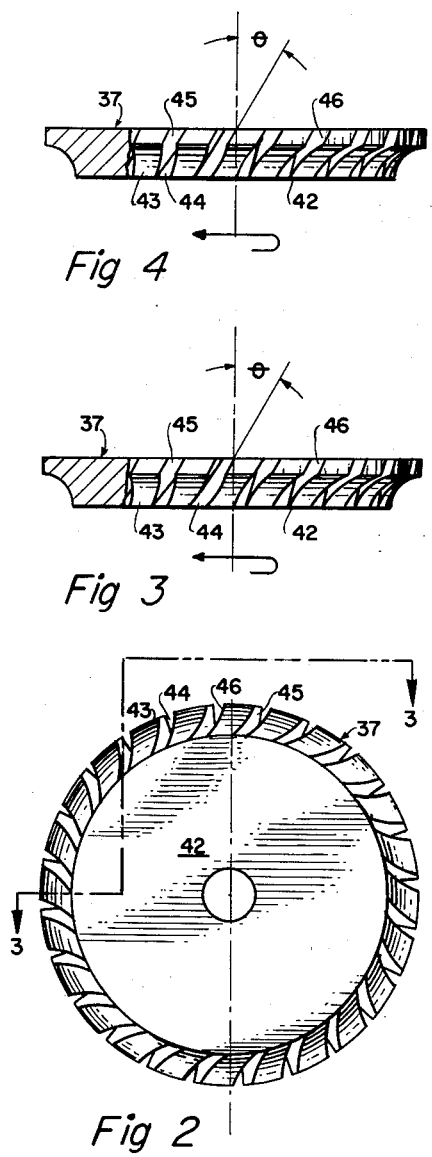
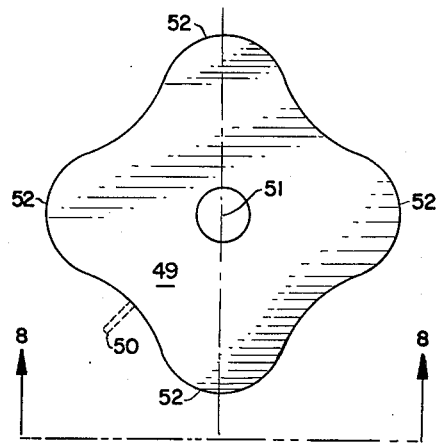
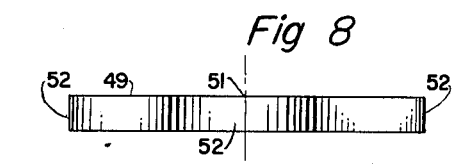
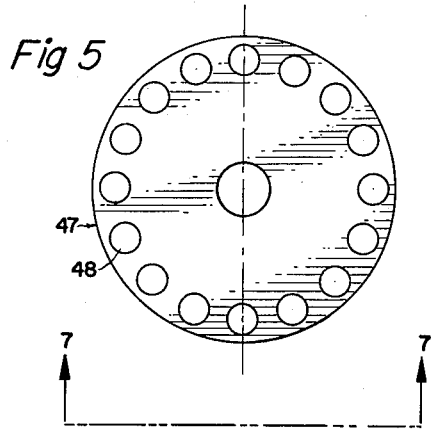
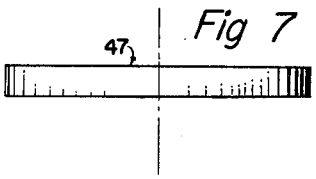

United States Patent Office 3,044,711
Patented July 17, 1962

3,044,711
FLUID FLOW MODULATOR
William A. Douglas, South Pasadena, and Paul P. Datner, West Covina, Calif., assignors to Aerojet-General Corporation, Azusa, Calif., a corporation of Ohio
Filed July 22, 1957, Ser. No. 673,531
11 Claims. (Cl. 239—99)

This invention relates to modulation of fluid flow, and in particular to a modulator means for providing a pulsating fluid stream.

An object of this invention is to provide means whereby a fluid stream such as a flowing stream of a liquid propellant from a supply tank to a combustion chamber, for example, can be modulated so as to have a pulsating flow. The operation of a device relying on the fluid for its actuation will thereupon be similarly modulated.

This invention is carried out in combination with a fluid stream moved by a differential pressure along a path from a supply point to a point of use. A feature of the invention resides in modulator means which in one position thereof impedes fluid flow to the point of use, and in another position thereof permits a substantially unimpeded fluid flow.

According to a preferred form of the invention which may be utilized if desired, the modulator means comprises a rotary member, portions of which intermittently pass across the path of stream flow when the member is rotated, and thereby alternately permit and impede the fluid flow. This provides the desired modulated, pulsed flow.

A related but optional feature of the invention resides in a rotating disc having a central axis of rotation, and having perforations therethough which perforations also have central axes, the axes of the perforations being skew to the axis of rotation of the disc. By these means the speed of rotation of the disc and the linear flow rate of the fluid stream can be mutually adjusted so as to pass fluid through the perforation without substantial acceleration; that, without a substantial change in the direction or in the velocity of flow of fluid.

A further optional feature resides in the provision of a rotary disc with a periphery having a projection thereon which in one position of the disc enters the path of fluid flow to impede the same, and in another position of the disc stands out of said path.

These and other features of the invention will be fully understood from the following detailed description and the accompanying drawings, of which:

FIG. 2 is a view taken at line 2—2 of FIG. 1 particularly showing a rotary modulator disc;

FIG. 3 is a fragmentary side view partly in cross-section taken at line 3—3 of FIG. 2;

FIG. 4 is a fragmentary side view of the modulator disc of FIG. 3 after being rotated through an angle from its position in FIG. 3, partly in cross section.

Figure 1:
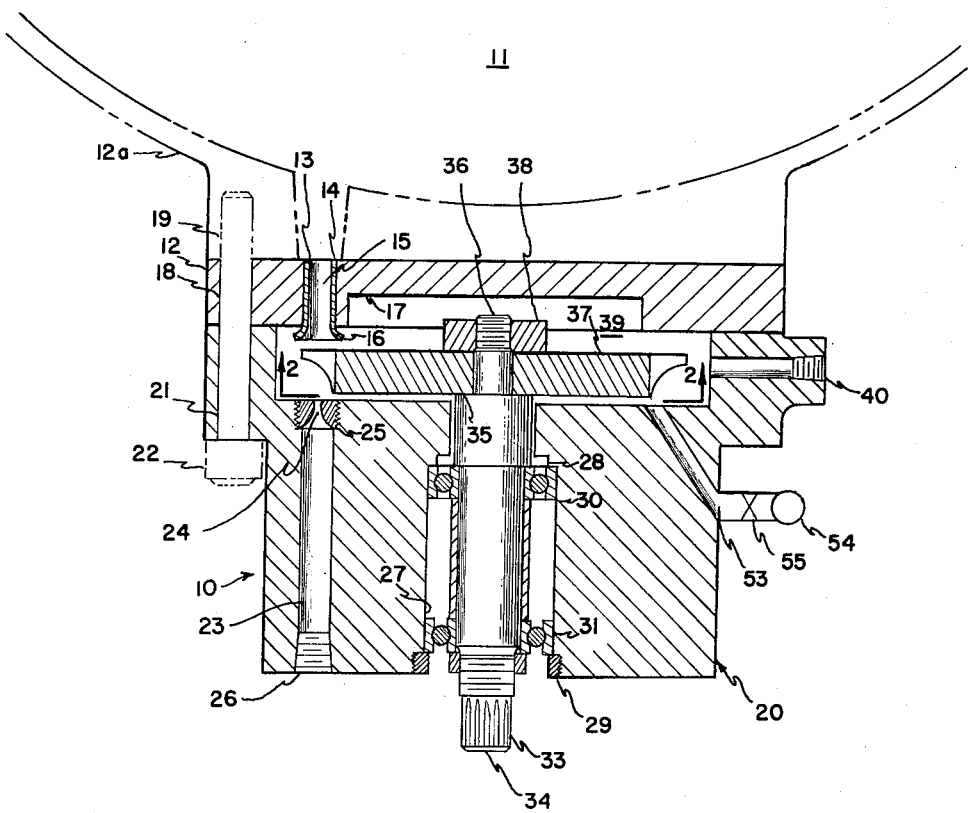
FIG. 1 is an elevation, partly in cross section, showing a fluid flow modulating device according to the invention.

FIGS. 5 and 6 are plan views of other types of modulator discs which can be substituted in the device of FIG. 1 for the disc shown therein; and FIGS. 7 and 8 are side views taken at lines 7—7 and 8—8 of FIGS. 5 and 6, respectively.

In FIG. 1 there is shown a fluid flow modulator device 10 according to this invention which is adapted to supply a liquid propellant fuel to a combustion chamber 11. This combustion chamber could be part of a gas generator, or rocket motor or the like. A mounting block 12 is placed adjacent the combustion chamber wall 12a and mounted thereon. This mounting block has a port 13 therein with an insert 14 having a passage 15 therethrough and a flare 16 spaced from the surface of the mounting block on its side opposite the combustion chamber. The mounting block has a sink 17 at a central part thereof, and bolt holes 18 aligned with threaded receptacles 19 in the combustion chamber wall 12a.

A support block 20 has bolt holes 21 therein. Bolts 22 pass therethrough and bear on the flange of the support block 20 to hold it and the mounting block to the wall of the combustion chamber when threaded into receptacles 19. A fluid supply conduit 23 passes through the support block and terminates at a nozzle 24 which may conveniently be formed by an insert 25 threaded into the conduit.

The nozzle 24 is directly opposite the flare 16 of the insert 14 on the mounting block, and thus discharges into passage 15 when unimpeded. The fluid supply conduit has threads 26 at its outer end to which a source of supply of fluid whose flow is to be modulated is attached. The particular type of fluid to be modulated by this device is not of importance to this invention, nor is the nature of the pressurized source. Therefore no detailed description will be given of either.

At a central portion of the support block there is a bore 27 having a bearing retaining shoulder 28, and a bearing retaining insert 29. Bearings 30, 31 are seated in this bore and are retained in place by a retaining insert 29 which is threaded into the end of the bore 27.

A rotary shaft 33 is centrally mounted in this bore by means of the bearings 30, 31. It is conveniently provided with splines 34 at a protruding end thereof for attachment to a suitable driving mechanism (not shown). At the other end of the shaft there is a shoulder 35 and a threaded end 36. A modulator disc 37 is fitted over this rotary shaft 33 so as to bear against shoulder 35, and then nut means 38 are tightened on to the threaded end 36 so as to hold the modulator disc on the shaft.

There is thus provided a modulator disc rotatably mounted within a chamber 39, which chamber is formed between the mounting block and the support block. A drain port 40 opens from the chamber 39 so as to drain fluid therefrom.

The modulator disc 37 is more particularly shown in FIG. 2. This disc has a central portion 42, and spaced projections 43 on its periphery. These spaced projections have gaps 44 between them, and the side boundaries 45, 46 of the gaps are slanted for a purpose later to be described. This slant is best shown in FIG. 3.

Another useful form of modulator disc 47 shown in FIG. 5, which may be used in place of disc 37, has holes 48 disposed in a circular pattern near the edge of the disc. These holes pass directly through the disc and may be aligned with the axis of rotation if desired.

In FIG. 6 there is shown a modulator disc 49 configuration which may also be used in place of disc 37. This disc 49 is adapted for producing a modulation of sinusoidal character. For use with this modulator disc 49, the nozzle 24 is provided in the shape of a slit 50, instead of the circular nozzle shown in FIG. 1. An extension of this slit would pass through the central axis of rotation 51 of the modulator disc 49. The modulator disc 49 has a generally circular central portion, and projections 52. The peripheries of these projections are curved and undulant, the curve extending from a position tangential with the circular portion of the plate to a point maximum distance away from the circular portion and the central axis of rotation.

With reference to FIG. 1, a port 53 passes through the support block to chamber 39, and a gas supply tank 54 is connected to this port through a reducing valve 55.

The operation of this device to modulate the flow of a fluid stream will now be described. It is evident that the fluid will be provided to the combustion chamber in the form of a jet stream which is projected from nozzle 24 across chamber 39 and through passage 15. To avoid breaking up this jet stream in the chamber 39, the chamber will be maintained at a pressure lower than that of the fluid in supply conduit 23. To prevent back flow of fluids from the combustion chamber into chamber 39, the chamber will be maintained at a higher pressure than the combustion chamber. Therefore the pressure in chamber 39 lies between that of the supply conduit 23 and that of the combustion chamber. This pressure is obtained by appropriately adjusting reducing valve 55 so as to permit gas under pressure to flow from the tank 54 or some other source into the chamber. The gas for this purpose will be one which is non-reactive with the fluid from the supply conduit.

The rotary shaft is now turned at some speed which will place an open or perforated portion of the disc opposite the nozzle 24 at the frequency desired for the modulated fluid flow. The shaft may be driven by any appropriate means, such as a motor (not shown) attached at the splines 34.

Projections 43 of the modulator disc of FIG. 2 or some imperforated portion when the discs shown in the other figures are used, are disposed radially from the axis of rotation of the disc sufficiently far that at in at least one rotational position of the disc, they stand between the nozzle 24 and passage 15 and impede flow across the chamber 39 between these two. At this time the jet stream simply splashes on these projections and falls in the chamber to be drained from port 40.

When no projection on the disc is in the path of the jet stream, or when a gap or hole in the disc stands in that path, the jet stream passes through to the passage 15 and into the combustion chamber. It will be appreciated that the frequency of pulsation, that is, the modulated character of the stream flow into the combustion, is a direct function of the frequency with which a perforation or gap in the disc stands in the path of the jet stream.

Since the projections and gaps pass across the jet stream at equal radial distances from the central axis of rotation, but at an angular spacing from each other, it is evident that there are at least two points similarly spaced, one of which lies on the modulator disc and one which does not. When these points pass through the stream, the modulator disc structure of the first point impedes the stream, and the absence of it at the second point permits unimpeded stream flow.

Any of the modulator discs shown in the drawings will act in this manner. The preferred disc is that shown in FIG. 2 where the projections are formed so that the gaps, which may be assumed to have a central axis, are arranged with their central axis skew to the axis of rotation of the disc. The optimum disposition of these gaps is such that the axis of each lies on a plane which is parallel to a plane that is tangential to the radius which passes through the midpoint of the gap's axis.

With this preferred type of gap or perforation, a fluid particle moving with an axial velocity from nozzle 24 toward the passage 15 (see FIGS. 3 and 4) may enter one of the gaps 44 between projections 43. If the modulator disc is being turned at a correct angular velocity, the slanted gap will "move out of the way" as the particles pass through, and the path of the particles remains aligned with the axis of rotation of the disc as it passes through the disc. The particle thus does not receive any acceleration either by change of velocity, or by change of direction. In FIGS. 3 and 4 the disc is moving clockwise as viewed from the top.

For such an arrangement, the gaps have a skew angle $\theta$ with respect to the central axis of the disc. The disc is turned at a rate such that the tangential speed of the gap will be equal to the axial velocity of the fluid particle multiplied by the cosine of the angle $\theta$.

It will be recognized that this angle $\theta$ is a first approximation which is valid for reasonably large discs and reasonably small angles of rotation.

The nozzle and disc arrangement of FIG. 6 is a refinement for producing sinusoidal modulation. Instead of a circular nozzle 24, an insert is provided having a slit 50. The projections 52 are undulant in shape, and as the disc 49 is rotated, will impede a varying proportion of the jet stream. When the disc is positioned so that the slit is entirely "uncovered" full flow occurs to the passage 15. As the disc is turned further, an increasing proportion of the slit is "covered," and a smaller proportion of the jet stream reaches the passage. At one position, the projection substantially "covers" the slit, and nearly completely blocks flow to the passage. The proportion permitted to pass unimpeded at a given rotational position of the disc varies with the configuration of the projections.

It will be appreciated that other than simple sinusoidal wave forms may be provided simply by an appropriate selection of projection configuration.

It will be clear from an examination of the drawings that fluid is in steady flow from conduit 24 into chamber 39. The disc does not act as a valve to shut off this flow, although it could if such a result were desired. In its preferred embodiment, this disc simply impedes the direct jet flow from nozzle 24 to passage 15. It will be recognized that more than one nozzle 24 could be used.

This invention will find its greatest usefulness in modulating liquid flow, inasmuch as the jet of liquid when impeded will simply spash from the disc and be drained from chamber 39. However, it is also useful in modulating gas streams if desired.

The small orifice 24 has a constant pressure drop regardless of the flow rate. The disc will therefore be operated in a substantially constant-pressure region. Accordingly, the rate of flow to the chamber is also controlled by the disc, a faster rotation cutting down the flow rate.

There is thus provided by this invention a means for mechanically modulating the flow of a fluid stream. The frequency of pulsation may be adjusted both by varying the numbers of projections or perforations of the discs, and also by adjusting the angular velocity of the modulator disc. This device could be used for modulating the flow of monopropellants such as nitromethane, or could modulate the flow of such fluids as red fuming nitric acid or gasoline, as examples.

It will be appreciated that many configurations of projections or perforations may be provided, and also more complex curved surfaces, similar to those encountered in turbine design, may be provided for permitting an optimum deflection-free passage of fluids through the modulator disc. Therefore this invention is not to be limited by the embodiments shown in the drawing and described in the description, which are given by way of example and not of limitation. This invention is to be limited only in accordance with the scope of the appended claims.

We claim:
1. A fluid flow modulation device comprising a body having a cavity therein, a fluid supply conduit through said body to said cavity, a nozzle interconnecting said fluid supply conduit and cavity, said body also having a passage therethrough disposed opposite said nozzle in said cavity so as to receive a fluid stream therefrom, a modulation disc rotatably mounted in said cavity, projections on said disc creating gaps between said projections, the disc being so disposed and arranged that rotation of the disc causes projections and gaps alternately to pass across the path of stream flow between the nozzle and the passage, thereby alternately impeding and permitting flow to said passage, respectively.

2. Apparatus according to claim 1 in which the modulator disc has a central axis of rotation and in which the gaps have an axis which is skew to said central axis of rotation.

3. A system for introducing fluid into a chamber in a cyclical pulsating flow comprising: a source of fluid pressurized to a value greater than the pressure obtaining within the fluid chamber, a body having a cavity therein pressurized to a value intermediate those obtaining within the fluid source and the fluid chamber, means including an orifice for interconnecting the fluid source and the body cavity, means arranged within the cavity for directing the fluid stream issuing from said orifice into the fluid chamber, means mounted within the cavity capable of alternately impeding and permitting a fluid stream flow from the orifice to the directing means, and means independent of the fluid stream for actuation of the means capable of alternately impeding or permitting the fluid stream flow arranged in operative relation therewith.

4. A variable fluid flow system comprising: a pressurized fluid source, a body having a cavity therein, a fluid supply conduit leading through said body from said source to said cavity, a nozzle interconnecting said fluid supply conduit and said cavity, a fluid reception chamber, said body also having a passage therethrough disposed opposite said nozzle in said cavity so as to receive a fluid stream therefrom and leading from said cavity to said fluid reception chamber, means for maintaining the pressure within said cavity at a value higher than that within said fluid reception chamber, means for maintaining the pressure within said fluid source at a value higher than that within said cavity, a modulation disc rotatably mounted in said cavity in the fluid stream path between said nozzle and said passage, and variable speed means independent of the fluid stream for rotating said disc arranged in operative relation therewith.

5. System according to claim 3 wherein said means capable of alternately impeding or permitting the fluid stream flow comprises a rotatable disc, said disc having spaced perforations near the periphery thereof.

6. System according to claim 3 wherein said orifice comprises a longitudinal slit and said means capable of alternately impeding or permitting the fluid stream flow comprises a rotatable disc having an undulant periphery and a central axis of rotation, said longitudinal slit being so disposed and arranged that, if extended, it would pass through said central axis of rotation, whereby rotation of said disc impedes a varying proportion of the fluid stream flow issuing from said longitudinal slit, thereby modulating said stream flow.

7. System according to claim 3 wherein said means capable of alternately impeding or permitting the fluid stream flow comprises a rotatable disc having a central axis of rotation and having a plurality of holes therethrough near its periphery, said holes being arranged to be equidistant from the axis of rotation of said disc and from each other.

8. System according to claim 3 wherein said means capable of alternately impeding or permitting the fluid stream flow comprises a rotatable disc having a generally undulant periphery and a central axis of rotation.

9. Apparatus for introducing fluid into a chamber in a cyclical pulsating flow comprising: a source of fluid pressurized to a value greater than the pressure obtaining within the fluid reception chamber, a body having a cavity therein pressurized to a constant value which is intermediate the pressures obtaining within the fluid source and the fluid chamber, means including an orifice for interconnecting the fluid source and the body cavity, means arranged within the cavity for directing the fluid stream issuing from said orifice into the fluid chamber, dynamically balanced rotational means mounted within the cavity capable of alternately impeding and permitting a fluid stream flow from the orifice to the directing means, and means independent of the fluid stream for actuation of the means capable of alternately impeding or permitting the fluid stream flow arranged in operative relation therewith.

10. A fluid flow modulation device comprising a body having a cavity therein, a fluid supply conduit through said body leading to said cavity, a nozzle interconnecting said fluid supply conduit and said cavity, said body also having a passage therethrough disposed opposite said nozzle in said cavity so as to receive a particulate fluid stream therefrom, a modulation disc comprising a rotatable body having a central axis of rotation, and a plurailty of projections extending from the periphery of said rotatable body to form a plurality of gaps therebetween, said gaps having axes which are skew to the central axis of rotation and parallel to each other, and means for rotating said disc arranged in operative relation therewith, said rotation means being independent of the fluid stream and rotating said disc at a rate substantially determined by the formula:

$$S = V \text{ cosine } \theta$$

where S is the speed of rotation of the disc having gaps, V is the actual velocity of any given fluid particle traveling through a gap, and $\theta$ is the skew angle of the gaps with respect to the central axis of the disc, whereby the fluid is passed through the disc without substantial acceleration.

11. A fluid flow modulation device comprising a body having a cavity therein, a fluid supply conduit through said body leading to said cavity, a nozzle interconnecting said fluid supply conduit and said cavity, said body also having a passage therethrough disposed opposite said nozzle in said cavity so as to receive a fluid stream therefrom, a modulation disc rotatably mounted in said cavity in the fluid stream path between said nozzle and said passage, and variable velocity means independent of the fluid stream for rotating said disc arranged in operative relation therewith, said modulation disc comprising a rotatable body having a central axis of rotation, and a plurality of projections extending from the periphery of said body to form a plurality of gaps therebetween, said gaps having axes which are skew to the central axis of rotation and parallel to each other.

References Cited in the file of this patent

UNITED STATES PATENTS 679,761   Lion _____ Aug. 6, 1901

FOREIGN PATENTS 674,168   Great Britain _____ June 18, 1952